(12) United States Patent
Williams et al.

(10) Patent No.: US 8,417,434 B2
(45) Date of Patent: Apr. 9, 2013

(54) ACTIVE PATTERN FACTOR CONTROL FOR GAS TURBINE ENGINES

(75) Inventors: Brandon Phillip Williams, Urbandale, IA (US); Jerry Lee Goeke, West Des Moines, IA (US)

(73) Assignee: Delavan Inc, West Des Moines, IA (US)

( * ) Notice: Subject to any disclaimer, the term of this patent is extended or adjusted under 35 U.S.C. 154(b) by 0 days.

(21) Appl. No.: 13/477,509

(22) Filed: May 22, 2012

(65) Prior Publication Data
US 2012/0227410 A1 Sep. 13, 2012

Related U.S. Application Data

(62) Division of application No. 12/046,977, filed on Mar. 12, 2008, now Pat. No. 8,200,410.

(51) Int. Cl.
*G06F 19/00* (2011.01)

(52) U.S. Cl. .................. 701/100; 60/39.281; 60/39.55; 422/600; 422/607; 422/220

(58) Field of Classification Search .................. 701/100; 422/600, 607, 220, 9, 194; 60/777, 39.28, 60/39.281, 39.55, 804, 737, 748; 431/7; 430/9; 239/135; 123/467, 549
See application file for complete search history.

(56) References Cited

U.S. PATENT DOCUMENTS

| | | | |
|---|---|---|---|
| 2,468,584 A | 4/1949 | Wotring | |
| 2,975,785 A | 3/1961 | Sheldon | |
| 3,352,155 A | 11/1967 | Penet | |
| 3,532,121 A | 10/1970 | Sturman et al. | |
| 3,689,773 A | 9/1972 | Wheeler | |
| 3,762,442 A | 10/1973 | Paul | |
| 3,772,540 A | 11/1973 | Benson | |
| 4,521,088 A | 6/1985 | Masom et al. | |
| 4,709,155 A | 11/1987 | Yamaguchi et al. | |

(Continued)

FOREIGN PATENT DOCUMENTS

| | | |
|---|---|---|
| EP | 0 638 770 A1 | 2/1995 |
| EP | 0816760 A1 | 1/1998 |

(Continued)

OTHER PUBLICATIONS

Combined Search and Examination Report, dated Jun. 18, 2012, for corresponding United Kingdom Patent Application No. GB1203002.9.

(Continued)

*Primary Examiner* — Behrang Badii
(74) *Attorney, Agent, or Firm* — Edwards Wildman Palmer LLP; Scott D. Wofsy (57) ABSTRACT

A method of actively controlling pattern factor in a gas turbine engine includes the steps of issuing fuel into a combustion chamber of a gas turbine engine through one or more circumferentially disposed fuel injectors, determining an initial circumferential pattern factor in the combustion chamber, and adjusting fuel flow through one or more selected fuel injectors based on the initial circumferential pattern factor, to yield a modified circumferential pattern factor in the combustion chamber. The step of determining the circumferential pattern factor can include the steps of detecting a chemiluminescent signature within the combustor, correlating the chemiluminescent signature to an equivalence ratio, and computing the initial circumferential pattern factor based on the equivalence ratio. Alternatively, the step of determining the circumferential pattern factor can include the steps of measuring temperatures at a plurality of circumferential positions at the combustor exit and computing the initial circumferential pattern factor based on the measured temperatures.

9 Claims, 8 Drawing Sheets

U.S. PATENT DOCUMENTS

| | | | |
|---|---|---|---|
| 4,976,227 | A | 12/1990 | Draper |
| 5,051,631 | A | 9/1991 | Anderson |
| 5,071,105 | A | 12/1991 | Donze et al. |
| 5,257,496 | A | 11/1993 | Brown et al. |
| 5,303,684 | A | 4/1994 | Brown et al. |
| 5,319,931 | A | 6/1994 | Beebe et al. |
| 5,404,709 | A | 4/1995 | Mac Lean et al. |
| 5,423,175 | A | 6/1995 | Beebe et al. |
| 5,474,234 | A | 12/1995 | Maley |
| 5,488,340 | A | 1/1996 | Maley et al. |
| 5,608,515 | A | 3/1997 | Shu et al. |
| 5,661,969 | A | 9/1997 | Beebe et al. |
| 5,784,300 | A | 7/1998 | Neumeier et al. |
| 5,791,889 | A | 8/1998 | Gemmen et al. |
| 5,797,266 | A | 8/1998 | Brocard et al. |
| 5,809,769 | A | 9/1998 | Richards et al. |
| 5,828,797 | A | 10/1998 | Minott et al. |
| 5,857,320 | A | 1/1999 | Amos et al. |
| 5,961,314 | A | 10/1999 | Myhre et al. |
| 6,058,709 | A | 5/2000 | Richards et al. |
| 6,059,560 | A | 5/2000 | Richards et al. |
| 6,142,665 | A | 11/2000 | Haffner et al. |
| 6,205,764 | B1 | 3/2001 | Hermann et al. |
| 6,205,765 | B1 | 3/2001 | Iasillo et al. |
| 6,244,291 | B1 | 6/2001 | Hughes |
| 6,454,548 | B2 | 9/2002 | Falk et al. |
| 6,517,045 | B1 | 2/2003 | Northedge |
| 6,566,158 | B2 | 5/2003 | Eriksen et al. |
| 6,598,621 | B1 | 7/2003 | Wygnanski |
| 6,640,548 | B2 | 11/2003 | Brushwood et al. |
| 6,672,071 | B2 | 1/2004 | Woltmann |
| 6,688,534 | B2 | 2/2004 | Bretz |
| 6,773,951 | B2 | 8/2004 | Eriksen et al. |
| 6,848,667 | B1 | 2/2005 | Wygnanski |
| 6,918,569 | B2 | 7/2005 | Jansen |
| 6,928,878 | B1 | 8/2005 | Eriksen et al. |
| 7,004,449 | B2 | 2/2006 | Jansen |
| 7,007,661 | B2 | 3/2006 | Warlick |
| 7,137,613 | B2 | 11/2006 | Jansen |
| 7,603,915 | B2 | 10/2009 | Spivak et al. |
| 7,966,834 | B2 | 6/2011 | Myhre |
| 2002/0125336 | A1 | 9/2002 | Bretz |
| 2002/0134138 | A1 | 9/2002 | Philipp et al. |
| 2003/0056490 | A1 | 3/2003 | Anderson et al. |
| 2003/0056517 | A1 | 3/2003 | Brushwood et al. |
| 2003/0155031 | A1 | 8/2003 | Barton et al. |
| 2004/0154300 | A1 | 8/2004 | Woltmann |
| 2005/0107942 | A1 | 5/2005 | Nomura et al. |
| 2005/0180699 | A1 | 8/2005 | Shu et al. |
| 2005/0189021 | A1 | 9/2005 | Wygnanski |
| 2005/0247066 | A1 | 11/2005 | Myhre |
| 2006/0000219 | A1 | 1/2006 | Myhre |
| 2006/0118651 | A1* | 6/2006 | Kaneko et al. ............... 239/135 |
| 2006/0213200 | A1 | 9/2006 | Critchley et al. |
| 2006/0219968 | A1 | 10/2006 | Jansen |
| 2007/0119147 | A1 | 5/2007 | Cornwell et al. |
| 2007/0151252 | A1 | 7/2007 | Cornwell et al. |
| 2008/0000214 | A1 | 1/2008 | Kothnur et al. |
| 2009/0013693 | A1 | 1/2009 | Ols et al. |
| 2009/0026398 | A1 | 1/2009 | Overman et al. |
| 2009/0077945 | A1* | 3/2009 | Cornwell et al. .......... 60/39.281 |
| 2009/0180939 | A1* | 7/2009 | Hagen et al. ................. 422/194 |
| 2009/0204306 | A1 | 8/2009 | Goeke et al. |
| 2009/0277185 | A1 | 11/2009 | Goeke et al. |

FOREIGN PATENT DOCUMENTS

| | | | |
|---|---|---|---|
| EP | 0926325 | A2 | 6/1999 |
| EP | 1559887 | A2 | 8/2005 |
| GB | 2342504 | A | 4/2000 |
| GB | 2342782 | A | 4/2000 |
| GB | 2377555 | A | 1/2003 |
| GB | 2380064 | A | 3/2003 |
| GB | 2380065 | A | 3/2003 |
| JP | 05179995 | A | 7/1993 |
| JP | 06257748 | A | 9/1994 |
| JP | 07332609 | A | 12/1995 |
| JP | 08-68573 | | 3/1996 |
| JP | 08068537 | A | 3/1996 |
| WO | WO-9930006 | A2 | 6/1999 |
| WO | WO-0020786 | A1 | 4/2000 |
| WO | WO-02086364 | A1 | 10/2002 |
| WO | WO-03102454 | A1 | 12/2003 |
| WO | WO-2005047670 | A2 | 5/2005 |
| WO | WO-2005047670 | A3 | 5/2005 |

OTHER PUBLICATIONS

Cohen et al.; "Active Control of Combustion Instability in a Liquid-Fueled Low-N0x Combustor"; Journal of Engineering for Gas Turbines and Power, Apr. 1999, vol. 121/281.

Haile et al.; "Characterization of a Liquid Fuel Injector under Continuous and Modulated Flow Conditions"; Part. Part. Syst. Charact. 15 (1998) 136-144.

Heising et al.; "Periodic Liquid Fuel Sprays Combustion Processes and Their Damping of Combustion Instabilities"; American Institute of Aeronautics and Astronautics, 1999.

Hermann et al.; "Active Instability Control (AIC) of Spray Combustors by Modulation of the Liquid Fuel Flow Rate"; Combust. Sci. and Tech., 1996, vol. 118, pp. 1-25.

Johnson et al.; "Demonstration of Active Control of Combustion Instabilities on a Full-Scale Gas Turbine Combustor"; ASME Turbo Expo 2001, Jun. 4-7, 2001.

Johnson et al.; "Demonstration of Active Control of Combustion Instabilities on a Full-Scale Gas Turbine Combustor"; American Society of Mechanical Engineers, Apr. 11, 2002.

Johnson et al.; "Effects of Time Delay and System Noise Upon Active Control of Unstable Combustors"; American Institute of Aeronautics and Astronautics, 2001-0778.

Magill et al.; "Combustion Dynamics and Control in Liquid-Fueled Direct Injection Systems"; American Institute of Aeronautics and Astronautics, 2000-1022.

May, J.E., "Active Pattern Factor Control for Gas Turbine Engines", Published 1998 NASA. Available from http://www.grc.nasa.gov/WWW/RT/RT1997/5000/5540may.htm, Apr. 15, 1998 [cited based on URL content as of Jul. 9, 2009].

Murugappan et al.; "Application of Extremum Seeking Controller for Suppression of Combustion Instabilities in Spray Combustion"; American Institute of Aeronautics and Astronautics, 2000-1025.

Natural Gas Fuel for General Electric Aircraft Derivative Gas Turbines in Industrial Applications, General Electric Company Marine & Industrial Engine Projects Department, Cincinnati, Ohio 45215, MID-TD-0001-1, Aug. 1985.

Paschereit et al.; "Acoustic Control of Combustion Instabilities and Emissions in a Gas-Turbine Combustor"; Proceedings of the 1998 IEEE.

UK Search Report dated Jul. 13, 2009, for related UK application GB0904256.5.

UK Intellectual Property Office Search Report dated Dec. 9, 2009 in connection with UK Application No. GB0904256.5.

UK Intellectual Property Office Search Report dated Jan. 8, 2010 in connection with UK Application No. GB0904256.5.

Wu et al.; "High Response Valve for Active Combustion Control"; Proceedings of ASME Turbo Expo 2001, Jun. 4-7, 2001.

Zhu, M, et al., "Closed-Loop Combustion Control Using OH Radica Emissions," Proceedings of ASME Turboexpo 2000, May 8-11, 2000, Munich Germany.

Office Action for Japanese Patent Application No. 2009-055814, dated Oct. 23, 2012.

* cited by examiner

ACTIVE PATTERN FACTOR CONTROL FOR GAS TURBINE ENGINES

BACKGROUND OF THE INVENTION

1. Field of the Invention

The subject invention is directed to gas turbine engines, and more particularly, to systems for and methods of actively controlling pattern factor in gas turbine engines to optimize engine performance by improving fuel combustion, reducing emissions and increasing component longevity.

2. Background of the Related Art

Gas turbine engines typically include multiple fuel injectors arranged around a periphery of a combustion chamber. Depending on engine operating conditions, hot spots within the combustor can shorten the life of engine components, such as turbine blades. The overall spatial distribution of temperature within the combustor is referred to as the engine "pattern factor," which can be defined as the difference between maximum combustor temperature ($T_{max}$) and mean combustor exit temperature ($T_4$) divided by the difference between the mean combustor exit temperature ($T_4$) and the combustor inlet temperature ($T_3$). That is:

$$\text{Pattern factor} = [(T_{max} - T_4)/(T_4 - T_3)]$$

Historically, passive measures were employed to modify pattern factor, for example by modifying the fuel injection distribution pattern or changing the shape or capacity of the combustion chamber. However, passive controls have proven to be costly and to limit combustor performance.

Moreover, fuel supplied to any of the multiple fuel injectors in a combustor is typically supplied via a common fuel manifold, without individual control of fuel flow through each injector. Applicants recognize that fuel pressure to and fuel flow rate through each injector can therefore be influenced by external conditions, to cause unequal fuel distribution about the circumference of the combustor, which then may result in an undesirably high pattern factor.

Applicants recognize therefore, that there is a need in the art for systems and methods to minimize pattern factor and thus promote longevity of engine components. The present invention provides solutions for this need.

SUMMARY OF THE INVENTION

The subject invention is directed to a new and useful methods of active pattern factor control for gas turbine engines. In accordance with one aspect of the invention, a method of actively controlling a combustion pattern factor includes the steps of issuing fuel into a combustion chamber of the gas turbine engine through one or more circumferentially disposed fuel injectors, determining an initial circumferential pattern factor in the combustion chamber, and adjusting fuel flow through one or more selected fuel injectors based on the initial circumferential pattern factor, to yield a modified circumferential pattern factor in the combustion chamber.

The step of determining an initial circumferential pattern factor in the combustion chamber can, in-turn, include the steps of detecting a chemiluminescent signature within the combustor, correlating the chemiluminescent signature to an equivalence ratio, and computing the initial circumferential pattern factor based on the equivalence ratio.

Alternatively, in accordance with another aspect of the invention, the step of determining an initial circumferential pattern factor in the combustion chamber can include measuring temperatures at a plurality of circumferential positions at the combustor exit and computing the initial circumferential pattern factor based on the measured temperatures. Alternatively, temperature readings can be taken at other axial locations along the length of the turbine, and such temperature readings can be made through use of optical temperature sensors, for example.

In accordance with still another aspect of the invention a method of actively controlling a combustion pattern factor in a gas turbine engine includes the steps of issuing fuel into a combustion chamber of the gas turbine engine through a plurality of circumferentially disposed fuel injectors, measuring a fuel flow rate through two or more of the plurality of fuel injectors, comparing fuel flow rate through the two or more of the plurality of fuel injectors, and adjusting fuel flow rate through one or more injectors to maintain equal fuel flow to each of the two or more injectors, to achieve an optimal pattern factor. In such an instance, the fuel flow rate can be measured by measuring volumetric or mass flow rates, for example.

In accordance with a further aspect of the invention, a method of actively controlling a combustion pattern factor in a gas turbine engine includes the steps of issuing fuel into a combustion chamber of the gas turbine engine from one or more circumferentially disposed fuel injectors, determining a minimum quantity of fuel injectors required to flow fuel for maintaining combustion requirements, adjusting fuel flow through selected fuel injectors by actuating valve assemblies associated with the selected fuel injectors to fully open positions and by actuating valve assemblies associated with the unselected fuel injectors to fully closed positions.

As desired or required, the optional features set forth below can be incorporated into any embodiment of a method or system designed or constructed in accordance with the invention.

The step of measuring fuel flow rate through the one or more circumferentially disposed fuel injectors prior to and following the adjusting step can be additionally performed.

The step of adjusting fuel flow can include adjusting fuel flow to a pilot fuel circuit of a fuel injector. Such adjusting can include modulating, trimming, or a reduction or increase of flow rate performed in another manner. Alternatively or additionally, the step of adjusting fuel flow can include adjusting fuel flow to a main fuel circuit of a fuel injector. The step of adjusting fuel flow from selected fuel injectors can include opening or closing an electromechanical valve.

Methods and systems in accordance any embodiment of the invention can further include providing a valve arranged on a manifold, so as to be capable of adjusting fuel flow to a pilot fuel circuit and a main fuel circuit.

The step of adjusting fuel flow through the selected fuel injectors can include adjusting fuel flow to one or more selected fuel injectors, while maintaining fuel flow at an unchanged rate to other remaining injectors.

Methods and systems in accordance with the invention can also include adjusting fuel flow through the selected fuel injectors can include utilizing an electro-mechanical variable-displacement valve assembly integrated with the selected fuel injectors to adjust an amount of fuel flowing through the selected fuel injectors. The electro-mechanical valve can be adapted and configured to adjust to any degree necessary, and in one aspect is adapted and configured to vary fuel flow rate by about +/−20 percent from a mean fuel flow rate.

In any embodiments set forth herein, the fuel flow rate through each of the plurality of fuel injectors can be measured. Mass and/or volumetric flow rate measurements can be taken.

The step of determining the initial circumferential pattern factor can include sensing combustion conditions within the combustion chamber, which can include, in-turn, sensing thermo-chemical flame characteristics within the combustion chamber.

If so-embodied, separate manifolds can be provided to supply fuel separately to main fuel circuits and pilot fuel circuits.

These and other aspects of the subject systems and methods of active pattern factor control for gas turbine engines will become more readily apparent to those having ordinary skill in the art from the following detailed description of the invention taken in conjunction with the appended drawings.

BRIEF DESCRIPTION OF THE DRAWINGS

So that those having ordinary skill in the art to which the present invention pertains will more readily understand how to employ the active pattern factor control system of the present invention, details thereof will be described hereinbelow with reference to the drawings, wherein.

DETAILED DESCRIPTION

Gas turbine engines typically have sensors for measuring operating conditions, including, for example, combustor exit temperature or turbine inlet temperature ("T4"), compressor speed and pressure, total fuel flow rate to the combustor, and exhaust gas temperature and pressure. In active pattern factor control methods according to the present invention, additional measurements may also be needed to fine-tune engine performance. Such parameters include thermo-chemical characteristics of the combustor flame, and/or fuel flow rate at one or more fuel injectors delivering fuel to the combustion chamber of the engine. In accordance with one aspect of the invention, the turbine inlet temperature (T4), which is also sometimes referred to as the combustor exit temperature, can be advantageously utilized to control pattern factor.

The active pattern factor control systems and methods of the subject invention are primarily designed to optimize engine performance by improving fuel combustion, reducing emissions and increasing component longevity. The methods are well suited for any gas turbine engine, including, for example, industrial gas turbine engines, civil aircraft, and high power thrust augmented military aircraft engines. Accordingly, methods and systems described in accordance with the invention can be utilized in conjunction with rich or lean engine operating programs.

Figure 1:
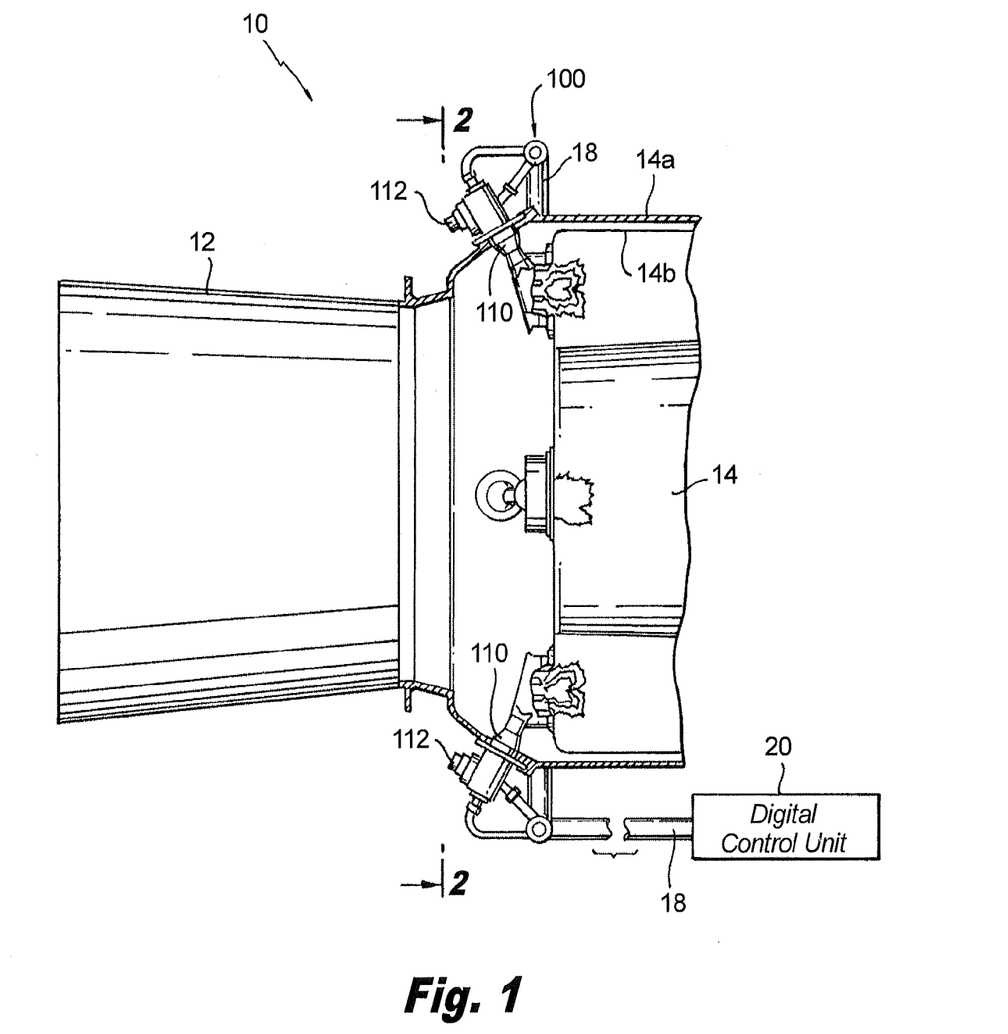
FIG. 1 is a side elevational view of a portion of a gas turbine engine that includes the active pattern factor control system of the subject invention, wherein the outer casing of the combustor is cut away and the inner liner sectioned to reveal several of the fuel injectors, which form part of the subject invention.

Referring now to the drawings wherein like reference numerals identify similar features or aspects of the subject invention, there is illustrated in FIG. 1 a gas turbine engine 10 that includes, among other things, an active control system, which can be adapted to implement the subject active pattern factor control methods as well as staging and trim control methods set forth in U.S. Patent Publication No. 2007/0119147, and its parent application U.S. Patent Publication No, 2006/0000219, which applications are incorporated herein by reference in their entirety. In accordance with the invention, the system is designated generally by reference numeral 100. In general, the gas turbine engine 10 includes a compressor 12, a combustion chamber 14 downstream from the compressor 12, and a turbine (not shown) downstream from the combustion chamber 14. The combustion chamber 14 includes a generally cylindrical outer combustion liner or casing 14a and a generally annular inner combustion liner 14b. Those skilled in the art will readily appreciate that other combustor configurations are possible, such as, for example, a can-type combustor.

The combustion control system 100 includes a plurality of fuel injectors 110, each mounted to the outer casing 14a of engine 10 for issuing atomized fuel into the inner combustion liner 14b of combustion chamber 14, as depicted. As explained in more detail below, one or more of the fuel injectors 110 of system 100 is instrumented in such a manner so as to facilitate measurement of thermo-chemical characteristics of the flame within combustion chamber 14, oscillating pressure changes within combustion chamber 14, and the fuel flow rate through the injector itself. In addition, as explained in more detail below, a fuel modulation valve 112, which may be a high-speed fuel modulation valve, is operatively associated each instrumented fuel injector 110 to control the flow of fuel delivered thereto during engine operation. In accordance with the invention, fuel modulation valves and other types of valves, such as electro-mechanical variable displacement valves can be used in series or in parallel with such modulation valves. It is preferred that any of the foregoing valves be provided integrated with or provided just prior to the fuel injectors to control fuel flow thereto, as illustrated. However, it is to be understood that the valves can be adapted and configured to control fuel supply to one or more fuel manifolds in order to simultaneously control fuel flow to a plurality of fuel injectors, as an alternative.

As shown in FIG. 1, fuel is delivered to the individual fuel injectors 110, and more precisely to the respective modulation valves 112 associated therewith, by way of a distribution manifold 18. In accordance with one aspect of the subject invention, the distribution manifold 18 receives metered amounts of fuel by way of a digital control unit 20, which can be a full authority digital electronic control (FADEC) unit. The digital control unit 20 accepts inputs (e.g., engine operating temperatures and pressures, shaft speeds and torques, environmental conditions) from various sensors on or within the turbine engine 10, and commands the position of a primary fuel-metering valve (not shown) based on software control laws developed for the specific engine application. The software control laws are written to optimize power output and drive the gas turbine engine in a safe operating region for a given power command and set of operating conditions. It is envisioned that the digital control unit can cooperate with combustion control system 100 to actively reduce engine emissions such as NOx.

As set forth above, the digital control unit 20, can be embodied as a FADEC. Alternatively, the digital control unit 20 for controlling pattern factor can be an auxiliary control unit used in conjunction with a FADEC. Alternatively still, pattern factor can be controlled by way of a distributed control system with control units arranged for example, at or near each fuel injector, which are adapted and configured to communicate with one another.

Figure 2:
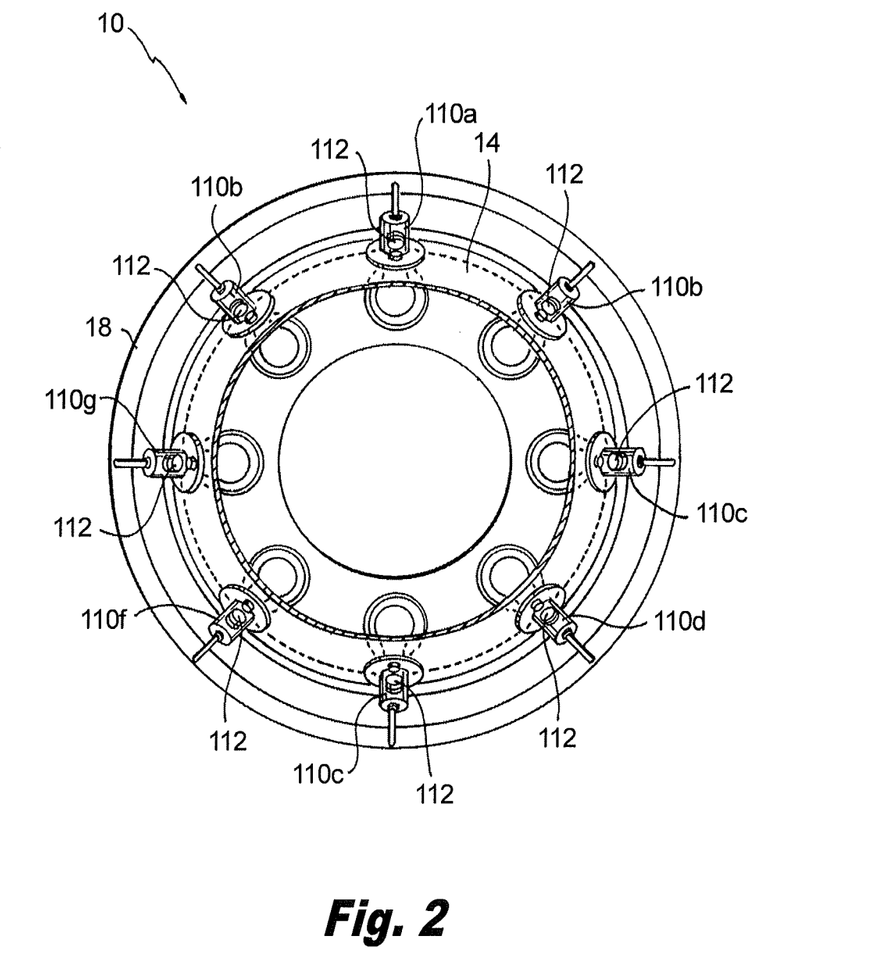
FIG. 2 is a cross-sectional view taken along line 2-2 of FIG. 1, through the combustion chamber of the gas turbine engine, illustrating a plurality of fuel injectors constructed in accordance with a preferred aspect of the subject invention.

Before turning to the detailed description of the instrumented fuel injectors 110, reference is made to FIG. 2 in which there is illustrated a plurality of instrumented fuel injectors 110a-110h, which are arranged circumferentially about the periphery of the combustion chamber 14. In this arrangement, combustion characteristics including thermochemical flame characteristics and acoustic pressure changes can be monitored and measured in a highly localized manner throughout the entire periphery of the combustion chamber 14, by the sensing instrumentation associated with each injector 110a-110h. Thus, in instances wherein the combustion characteristics in a certain location within the combustion chamber 14 are detected or otherwise measured relative to certain baseline values, the fuel flow to one or more of the injectors corresponding to that location in the combustor can be adjusted by the valve 112 associated therewith, so as to adjust a pattern factor, stabilize combustion and/or otherwise tune the engine.

Those skilled in the art should appreciate that the number of injectors shown in FIG. 2 is for illustrative purposes only and should not be deemed to limit the subject disclosure in any manner. Furthermore, it is envisioned, as an alternative, that more than one instrumented fuel injector can be associated with a single fuel modulation valve. Thus, although as preferred, each injector 110a-110h shown in FIG. 2 includes a respective fuel modulation valve 112, it is envisioned that a particular fuel modulation valve 112 can alternatively be configured to modulate fuel to multiple fuel injectors, for example, to each injector within a particular quadrant or zone of the combustion chamber 14. Accordingly, a manifold, such as manifold 18 may be used to distribute fuel from a valve 112 to multiple fuel injectors, as an alternative.

Figure 3:
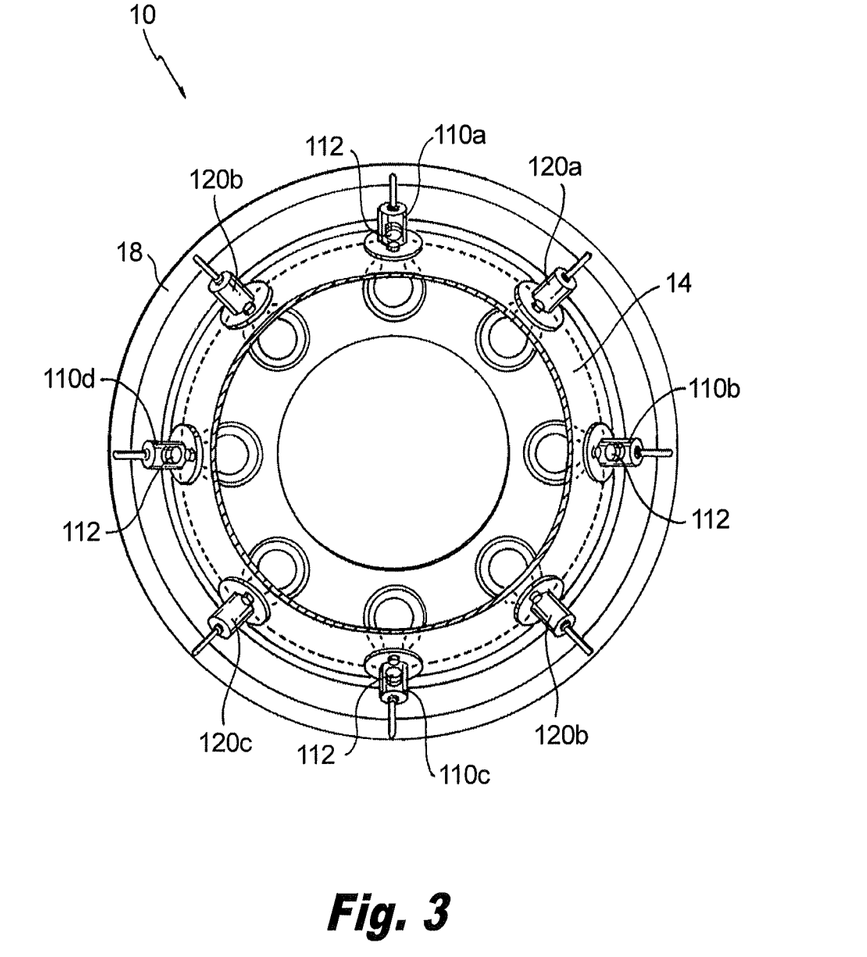
FIG. 3 is also a cross-sectional view taken along line 2-2 of FIG. 1, through the combustion chamber of the gas turbine engine, illustrating an alternative arrangement of fuel injectors, wherein several of the injectors are constructed in accordance with a preferred aspect of the subject invention and other injectors are constructed in a more conventional manner.

In an example alternative injector arrangement illustrated for example in FIG. 3, some of the fuel injectors provided in the engine 10 are instrumented and separately modulated with integral valves 112, while some injectors are not instrumented or separately modulated with integral valves. In particular, injectors 110a, 110b, 110c and 110d are instrumented so as to operate in accordance with the principles of the subject invention and include respective fuel modulation valves 112. In contrast, fuel injectors 120a, 120b, 120c and 120d are not instrumented, but instead they are configured in a more conventional manner to deliver atomized fuel to the combustion chamber 14 by the instrumented injectors. In such an arrangement, combustion characteristics are monitored and measured within certain combustion zones or quadrants of the combustion chamber 14. It is possible to divide the combustion chamber into multiple angular sectors. For example, any number between 1 and 12 or more zones could be defined, however fewer zones, such as four substantially equal quadrants, can provide adequate combustion control without excessive valves, sensors and controls, thereby minimizing weight and cost while maintaining an effective control system. It is envisioned that such an arrangement may be sufficient to actively control pattern factor and/or other combustion characteristics in certain, if not many, engine applications. In such a configuration, combustion characteristics such as pattern factor can be actively controlled within a certain combustion zone or quadrant by modulating fuel flow to one or more of the instrumented injectors 110a-110d associated with that zone or quadrant. This can be accomplished with each instrumented injector 110a-110d having a respective modulation valve 112 as shown. Alternatively, a modulation valve can be associated with more than one instrumented injector.

Those skilled in the art will readily appreciate that the circumferential position of the instrumented fuel injectors 110 and/or the number of instrumented fuel injectors 110 can vary depending upon the engine configuration and application. Indeed, it is envisioned and well within the scope of the subject disclosure that certain engine applications may only require a single instrumented injector 110, while the remainder of the fuel injectors in the engine are configured to operate in a more conventional manner.

Figure 4A:
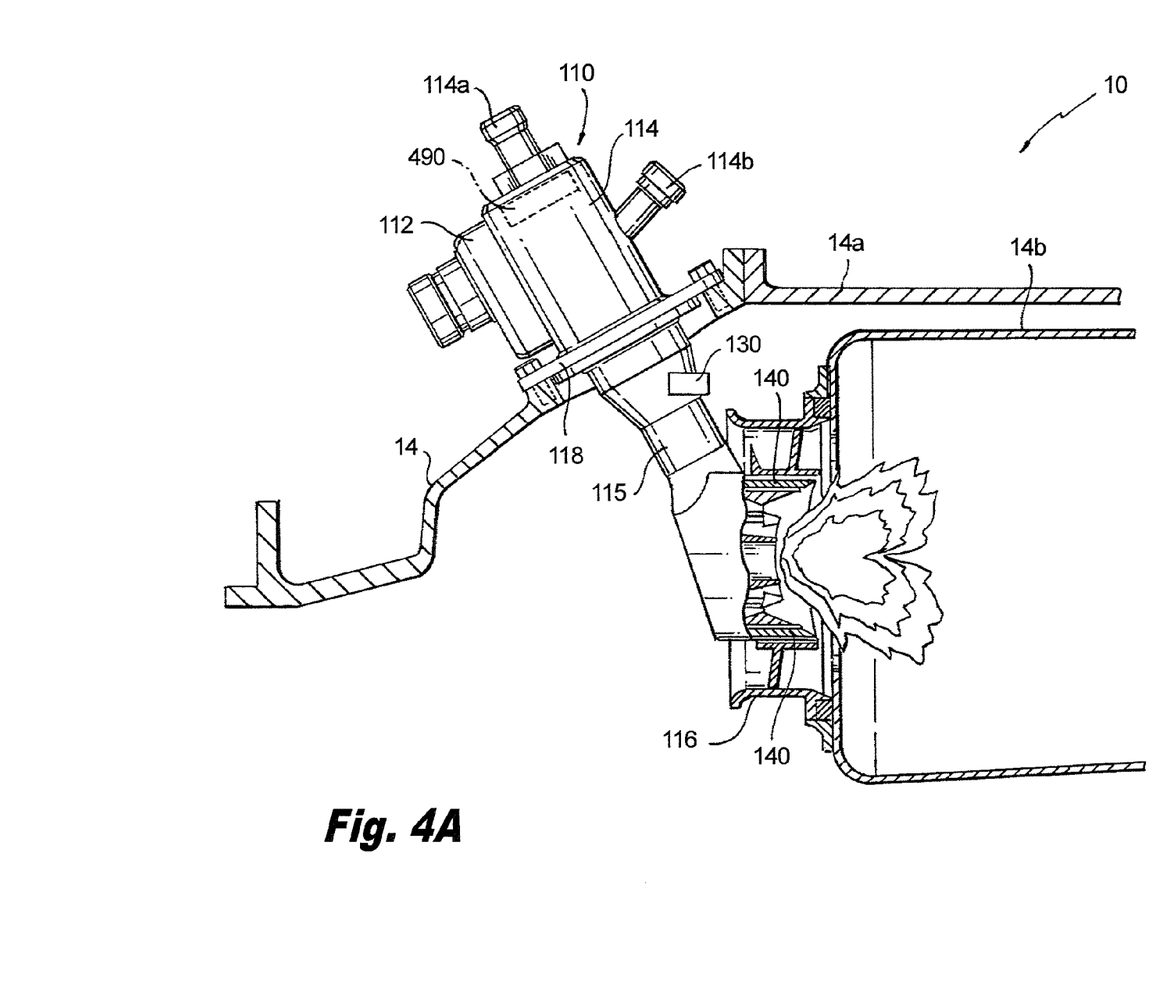
FIG. 4A is a side elevational view of a fuel injector constructed in accordance with a preferred aspect of the subject invention, wherein a dynamic pressure sensor is positioned on the injector body, and wherein the fuel nozzle is shown in cross-section to illustrate the location of the optical flame sensors.

Referring now to FIG. 4A, there is illustrated an instrumented fuel injector 110 constructed in accordance with the subject invention. Fuel injector 110 includes an inlet end portion 114 having fuel inlet fittings 114a and 114b for receiving fuel from distribution manifold 18. The fuel modulation valve 112 is housed in or otherwise operatively associated with inlet end portion 114 and is in fluid communication with the inlet fittings 114a, 114b. Fuel flowing into either one or both of inlet fittings 114a, 114b can be modulated by the valve 112.

Fuel injector 110 further includes a main body portion defined by a support strut or feed arm 115 that depends angularly from the inlet end portion 114. A fuel nozzle 116 depends from the lower end portion of feed arm 115 for issuing atomized fuel to the combustion chamber 14. A flange 118 is provided at the upper end portion of feed arm 115 for mounting the fuel injector 110 to the outer casing 14a of the gas turbine engine 10. In operation, internal fuel conduits (not shown) deliver modulated fuel flow from the valve assembly 112, through the feed arm 115 to the fuel nozzle 116.

Fuel injector 110 is adapted and configured to deliver atomized fuel into the inner combustion liner 14b of combustion chamber 14 under varying operating conditions including steady state flow and at controlled fuel flow modulation frequencies. Preferably, fuel injector 110 is adapted and configured for lean direct injection. However, those skilled in the art will readily appreciate that the fuel injector of the subject invention can be configured for a variety of fuel atomization applications. Moreover, it is noted that the precise configuration of fuel injectors that can be used in accordance with the subject methods, may vary as desired or required.

In general, there are two primary types of atomizing fuel injectors, and either type of injector may be employed with the control systems and methods of the subject invention. These devices include swirl pressure atomizers, which derive energy for atomization from fuel pressure, and air blast atomizers, which derive energy for atomization from high velocity compressor air. Examples of atomizing fuel injectors are disclosed in U.S. Pat. No. 6,688,534 to Bretz, the disclosure of which is incorporated herein by reference in its entirety.

With continuing reference to FIG. 4A, the instrumented fuel injector 110 includes a dynamic pressure sensor 130 for measuring acoustic pressure differentials within the combustion chamber 14 of turbine engine 10, and a flame sensor or optical sensor array 140 for observing flame characteristics within the combustion chamber 14 of turbine engine 10. Alternatively or additionally, if provided, one or more separate (not integral with the fuel injector) dynamic pressure sensors can be arranged within or near the combustion chamber. The dynamic pressure sensor 130 is located or otherwise supported on the feed arm 115 of fuel injector 110, upstream from the inner combustion liner 14b. Dynamic pressure sensor 130 is adapted and configured to detect thermo-acoustic pressure oscillations in the compressed air flowing through the combustion chamber 14.

Preferably, the dynamic pressure sensor 130 is in the form of an acoustic microphone that employs a piezoelectric dynamic pressure sensor. Importantly, the dynamic pressure sensor 130 is supported with a protective enclosure that is adapted for high temperature operation within the combustion chamber 14 of a gas turbine engine 10. The location of the dynamic pressure sensor 130 on the feed arm 115 can vary, as long as the sensor is adequately positioned with respect to the direction of the flow of air through combustion chamber 14.

An example of a dynamic pressure sensor is disclosed in U.S. Pat. No. 6,928,878 to Eriksen et al., the disclosure of which is incorporated herein by reference in its entirety. An example of a temperature resistant semiconductor support framework for a dynamic pressure sensor is disclosed in U.S. Pat. No. 6,773,951 to Eriksen et al., the disclosure of which is also incorporated herein by reference in its entirety. It is envisioned and well within the subject disclosure that alternative high temperature dynamic pressure sensors may be employed in the active pattern factor control system 10 of the subject invention including, for example, PCB sensors (manufactured by PCB Piezoelectronics, Depew, N.Y., USA) and vibrometers.

With continuing reference to FIG. 4A, the flame sensor 140 of the instrumented fuel injector 110 preferably includes an optical sensor array disposed within the fuel nozzle 116 for detecting flame characteristics relating to combustion characteristics such as an equivalence ratio, temperature. In particular, the flame sensor or optical sensor array 140 is adapted and configured to detect spectral and/or thermal characteristics of the combustor flame that occur downstream from the nozzle 116. In general, these characteristics are referred to herein as a "chemiluminescent signature." In this embodiment or alternatively with any other embodiment set forth herein, the optical sensor array 140 includes a plurality of light guide rods, such as, for example, sapphire rods that extend from a leading surface of fuel nozzle 116. An example of an optical sensor array constructed in this manner is disclosed in U.S. Patent Application Publication No. 2006/0000219 to Myhre, the disclosure of which is incorporated herein by reference in its entirety.

Additionally, a fuel flow sensor 490 can be provided in conjunction with the fuel injector 110. Although illustrated as being within the inlet portion 114, the flow sensor can be arranged at any point along the fuel flow path allowing for an accurate measurement of fuel flow rate. Accordingly, the fuel flow sensor 490 can be embodied as a separate element, and indeed may not be immediately adjacent thereto. The fuel flow sensor 490 can be any suitable type, and can be embodied as a mass flow sensor or volumetric flow sensor. An example flow sensor is described in U.S. patent application Ser. No. 11/895,196 to Spivak et al., filed Aug. 23, 2007, the disclosure of which is incorporated herein by reference in its entirety.

Figure 4B:
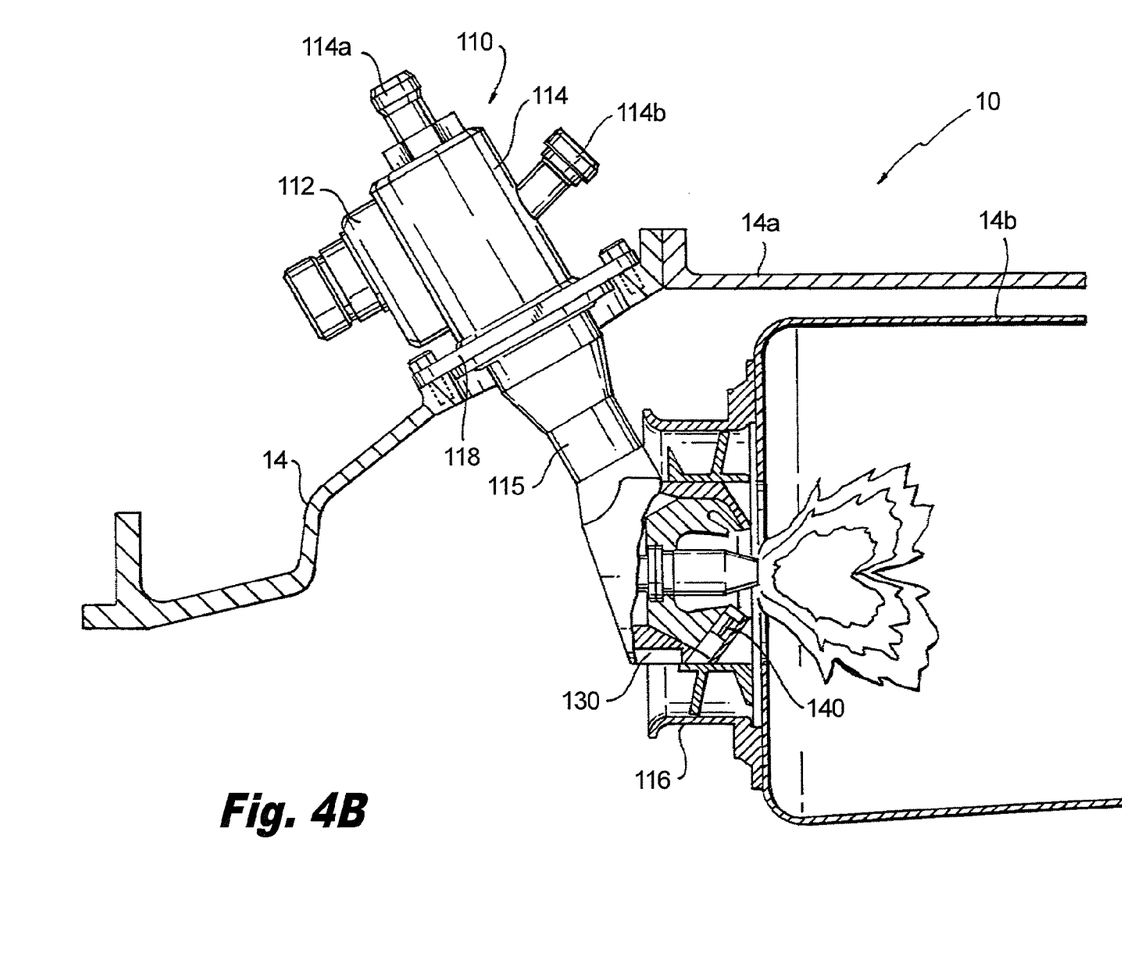
FIG. 4B is a side elevational view of another fuel injector constructed in accordance with a preferred aspect of the subject invention, wherein the fuel nozzle is shown in cross-section to illustrate the location of the dynamic pressure sensor and optical flame sensors.

Referring now to FIG. 4B, there is illustrated another embodiment of the instrumented fuel injector 110. In this or in any other embodiments of the subject invention, the dynamic pressure sensor 130 is not located on the feed arm 115 of the injector 110, but instead, it is located or otherwise supported within the fuel nozzle 116 of fuel injector 110. Furthermore, in this or alternatively in other embodiments of the subject invention, the flame sensor or optical sensor array 140 includes one or more optical fiber bundles extending from a leading surface of the nozzle 116. An example of an optical sensor array constructed in this manner is disclosed in U.S. Patent Application Publication 2005/0247066 to Myhre, the disclosure of which is herein incorporated by reference in its entirety.

Figure 5:
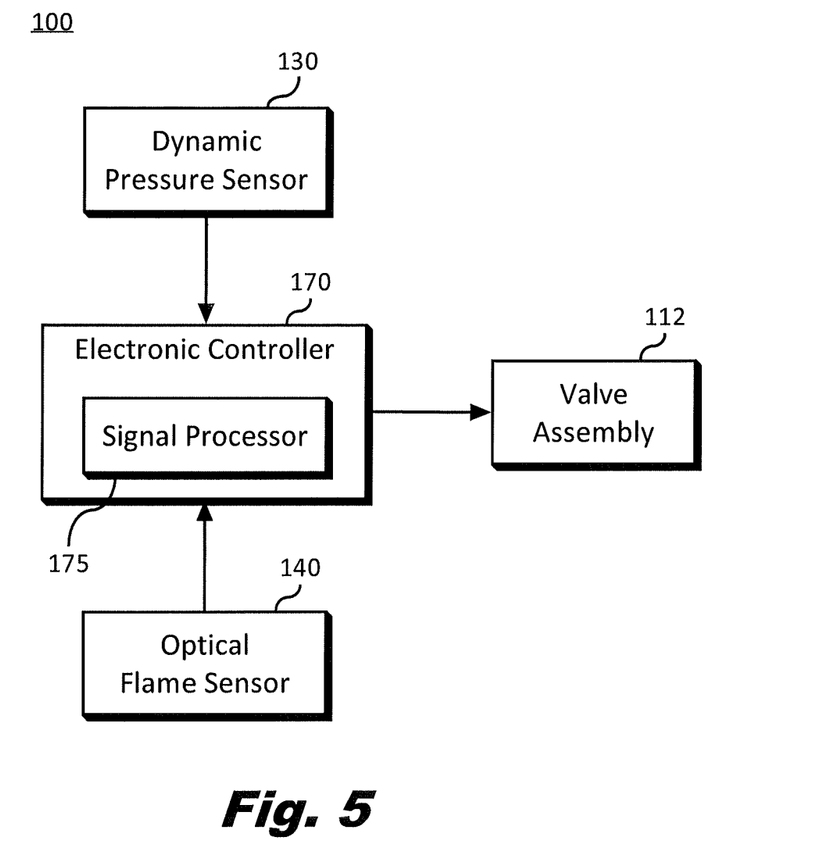
FIG. 5 is a flow chart illustrating the flow of information between the sensors disposed within the fuel injector of FIG. 4 and an electronic controller which forms part of the subject invention and which communicates with a valve assembly that delivers fuel to the fuel injector at a commanded flow rate, based upon input from the sensors.

Referring to FIG. 5, in operation, depending on the precise implementation, the dynamic pressure sensor 130 of an instrumented fuel injector 110 provides an output signal indicative of a pressure measurement to an electronic controller 170, which analyzes the signal using signal processor 175. Based upon the signal analysis, controller 170 commands the modulation valve 112 associated with injector 110 to modulate fuel flow to the injector 110 in a manner that maintains combustion stability, at least locally within the zone of the combustor with which the injector is associated.

In operation, the flame sensor or optical sensor array 140 provides an output signal to the signal processor 175 associated with electronic controller 170, which is analyzed by a spectrometer or similar device. The spectrometer is configured to derive flame quality parameters relating to combustion. These parameters include, for example, equivalence ratio of the combustion process in regions or quadrants of the combustor, flame intensity, flame stability and flame temperature, as well as the presence of fuel contaminants, and chemical emissions or radicals effecting combustion parameters. Spectral data of the combustion process, indicative of chemical emissions relating to combustion parameters can be obtained by the optical sensor array 140. From such data, an equivalence ratio of the combustion reaction can be determined, and therefore a circumferential pattern factor can be determined. U.S. Patent Publication Number 20050247066 to Myhre describes such use of optical combustion data. The foregoing application is incorporated herein by reference in its entirety. Upon receiving such data, the controller 170 provides commands to the valve assembly 112 associated with fuel injector 110 based upon the analyzed signal from flame sensor 140, so as to modulate fuel flow to injector 110 and adjust a circumferential pattern factor.

Alternatively or additionally, ion sensors can be employed to detect constituents in the combustion process, and thereby ascertain an equivalence ratio, upon which results fuel flow can be adjusted to reduce a circumferential pattern factor, which is defined hereinbelow.

As set forth above, each instrumented fuel injector 110 of the active pattern factor control system 100, for use with the subject methods, may include a fuel flow sensor for monitoring fuel flow rates at each fuel injector. The fuel flow sensors, in accordance with any embodiment set forth herein, are adapted and configured to operate at line pressures of between 200 to 1500 psig, and are designed to cover a range of fuel flow from 25% to 100% and a modulation of about ±20% of the average mean fuel flow to the nozzle. The location of the fuel flow sensor within the fuel injector can vary, as long as it is positioned to provide a precise measurement of the fuel flowing to the nozzle. An exemplary position for a fuel flow sensor 490 is illustrated in FIG. 4A. The flow sensor 490 can be a mass flow sensor or a volumetric flow sensor, for example. Such fuel mass flow sensors 490 enable accurate measurement of fuel flow through the fuel injector. The data obtained from this measurement, alone or in combination with other data, can then be used to adjust the fuel flow through one or more fuel injectors. An example fuel mass flow sensor is set forth in U.S. patent application Ser. No. 11/895,196 to Spivak et al., filed Aug. 23, 2007, which as set forth above is incorporated herein by reference in its entirety.

Although it is envisioned that each sensor in the fuel injector 110 can directly communicate with the electronic controller 170, as depicted in FIG. 5, it is envisioned that a sensor interface may be disposed within each injector 110 for receiving input signals from the dynamic pressure sensor 130 and the flame sensor 140, as well as other sensors that may be included in or on the fuel injector. The sensor interface is adapted and configured to communicate with the electronic controller 170, which in turn is adapted and configured to communicate with the modulating valve assembly 112. It is envisioned that the sensor interface can include digital communication features for communicating with the electronic controller 170.

As described briefly above, at least one injector 110, or alternatively all injectors, include(s) a dedicated fuel modulation valve 112 adapted and configured to modulate fuel flow to the injectors 110 in response to undesirable combustion conditions including undesirably high pattern factor detected by the flame sensor 140, temperature sensors, or fuel flow rate sensors 490. More particularly, fuel modulation valve 112 is configured to modulate fuel flow in proportion to detected undesirable combustion conditions up to about ±20% of the mean fuel flow, at a frequency of up to 1000 Hz. U.S. Patent Publication No. 2007/0151252 to Cornwell et al., which is incorporated herein by reference in its entirety, discloses various embodiments of a high speed fuel modulation valve that can be used in conjunction with the instrumented fuel injectors 110 of the combustion control system 100. In alternate embodiments, simple binary valves having only open and closed positions and other electro-mechanical variable displacement valves can be substituted for, or used in conjunction with valves such as those described by Cornwell.

It is also envisioned and well within the scope of the subject disclosure that alternative types of valve actuators can be utilized with the active pattern factor control system 100 of the subject invention, to modulate or otherwise deliver proportional and/or pulsed fuel flow to the instrumented injectors 110. These include, for example, electromagnetic, magnetostrictive valve actuators, piezoelectric valve actuators, valve actuators employing cavitating piezoelectric fuel modulation, MEMS type actuators (thermal, fluid or mechanical amplifiers), electro-dynamic valve actuators, and rotary-type valve actuators.

In accordance with the subject methods and related systems, one or more valves can be utilized in the process of adjusting fuel flow in a gas turbine engine to result in a desirable pattern factor. Such valves can additionally or alternatively be used in connection with other engine controls, such as combustion stability control systems, for example.

The valves set forth above can be actuated by any suitable means, but in a preferred aspect include electromechanical actuation. Such valves can include, but are not limited to, variable displacement proportional valves and pulsating valves capable of rapid movement, which valve can be a binary valve. As set forth above, however, any of the valves described in U.S. Patent Publication Number 2007/0151252 to Cornwell et al., or variations thereof, can be utilized.

Figure 6:
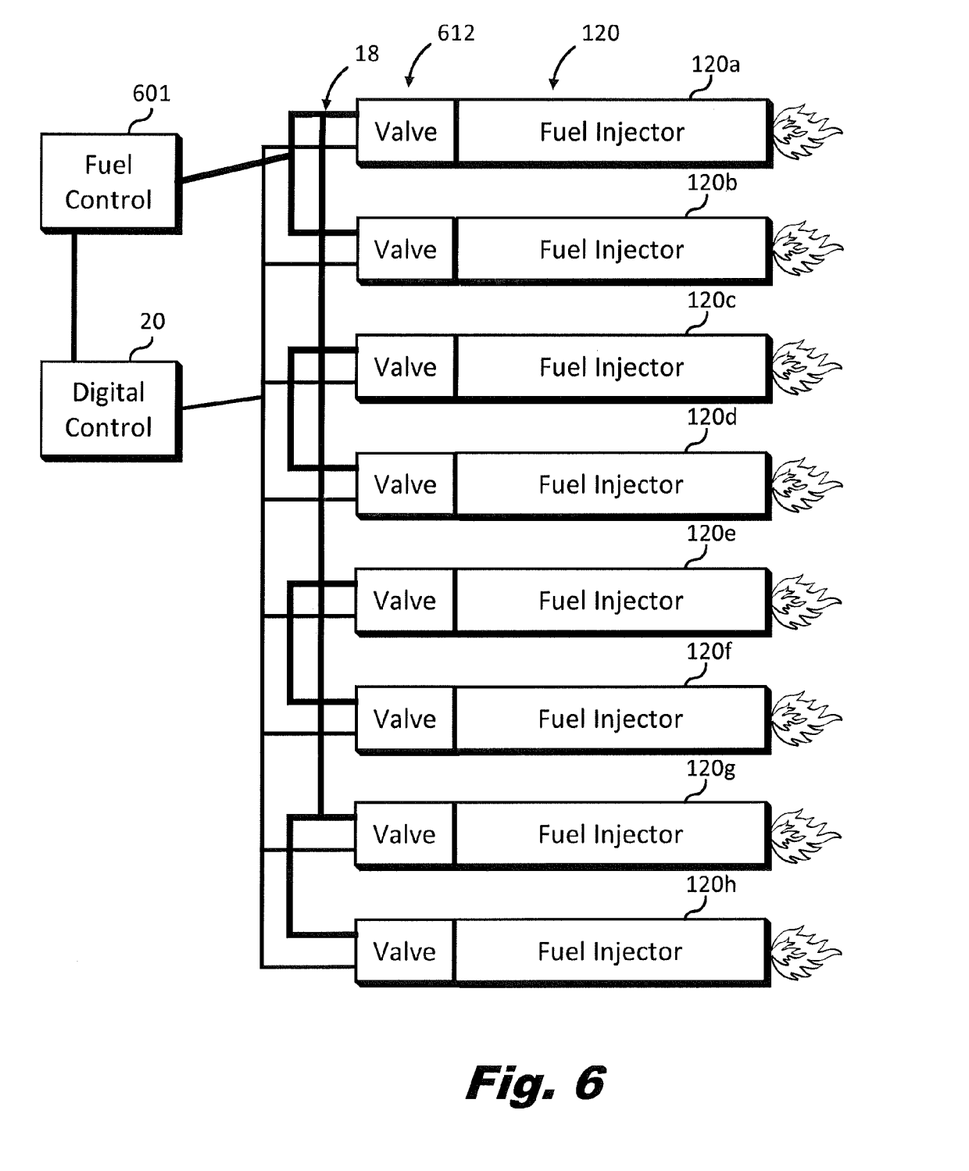
FIG. 6 illustrates an example system including a plurality of uninstrumented fuel injectors with integral valves for use in conjunction with the methods of the present invention.
Figure 7:
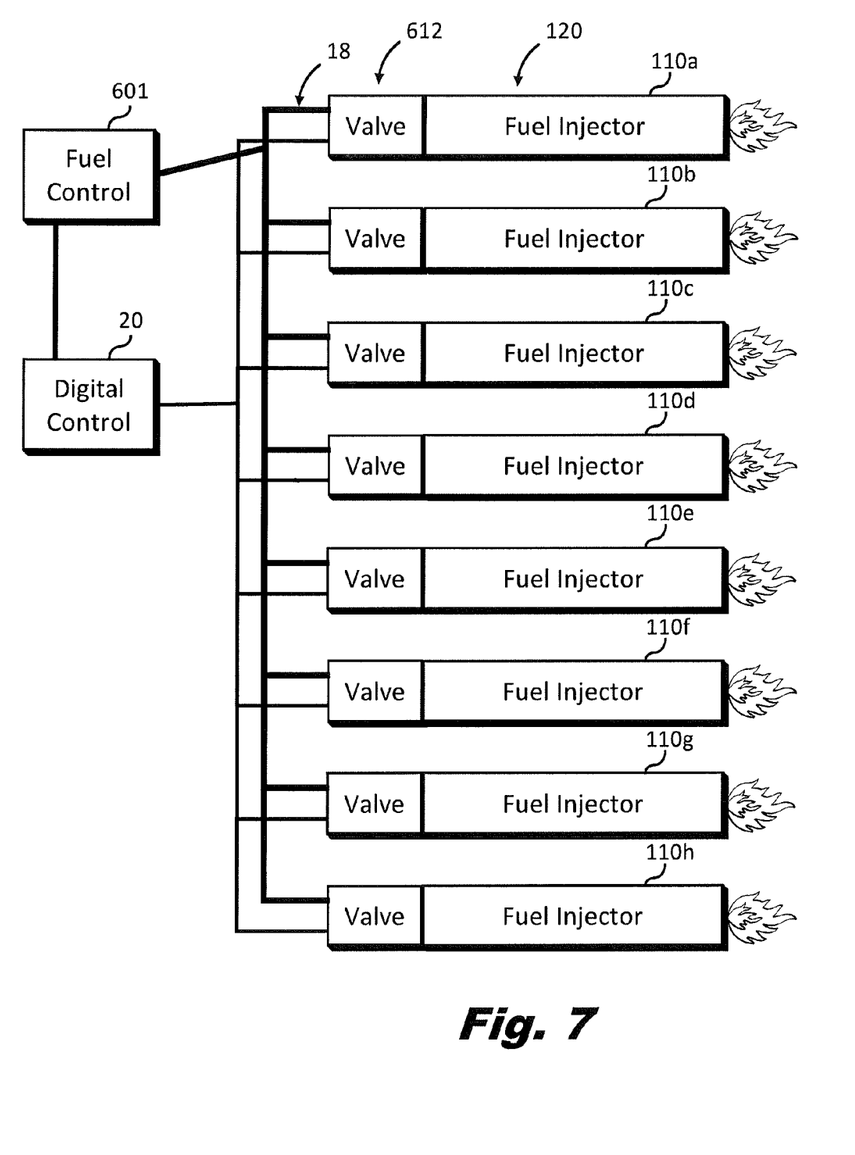
FIG. 7 illustrates an example system including a plurality of instrumented fuel injectors with integral valves for use in conjunction with the methods of the present invention.

FIGS. 6 and 7 are schematic illustrations of example systems and details of systems for use in conjunction with the methods of the present invention. FIG. 6 illustrates an example system 600, including a plurality of uninstrumented fuel injectors 120, such as those described hereinabove. Integral valves 612 are provided thereon, and may alternatively be arranged in a separate housing and connected via a conduit to each of the fuel injectors 120. Fuel is provided via a fuel control 601, and through a manifold 18 to the valves 612, and in-turn to the fuel injectors 120. A digital control unit 20, as described above, is configured to control the valves 612, as well as the fuel control 601.

In use, utilizing data obtained though the sensors described above, the electronic control 20, which can be a FADEC, operates one or more valves associated with each of the fuel injectors 120a-120h, adjusting the flow of fuel therethrough. Accordingly, for example, if a undesirable combustion conditions are indicated by the measurements taken from the sensors, fuel can be adjusted to remedy such conditions by opening or closing the respective valve 612. If the valve 612 is a variable valve that can be adjusted to provide pressure variation to result in a fuel flow rate within a particular mass or volumetric flow rate range, then adjustments of any increment can be made accordingly. If a pulsating valve is used in conjunction with the fuel injectors 120a-120h, then fuel flow can be modulated at any frequency for any desired duration, depending on whether reduced or increased amounts of fuel are required to improve the circumferential pattern factor, as determined by the digital control unit 20.

In accordance with the invention, binary valves are preferably used for staging control. In such applications, such valves improve turbine operability at low power conditions by adjusting local fuel air ratios in order to maintain stable combustion. Otherwise, at low power, the same reduced amount of fuel would be distributed among all fuel injectors, which would then be unable to sustain combustion. Typically, staging control does not improve circumferential pattern factor, due to the heterogeneity of the combustion about the circumference of the combustor. However, staging control does not result in turbine inlet temperatures that exceed allowable limits, and therefore does not conflict with the objectives of the present invention.

Moreover, although not explicitly illustrated in FIG. 6, one or more of the fuel injectors 120a-120h can be provided fuel by multiple fuel circuits. For example, fuel to each fuel injector can be provided by main and pilot fuel circuits, or by a common fuel supply circuit. The flow of fuel coming from each of these circuits and through the main and pilot fuel circuits within the injector 120 can be controlled with separate valves contained within an injector assembly. Alternatively, one or more of the valves can be arranged nearby on a conduit leading to the injector. One or more of the valves can be a proportional valve, and/or one or more of the valves can be a pulsating valve. In accordance with one aspect, flow of pilot fuel is controlled by way of a binary valve and flow of main fuel is controlled by way of a proportional valve.

As an example, in an instance of low power operation, or an undesirable combustion condition, fuel can be reduced or cut off to certain injectors, such as to injectors 120a, 120c, and 120d. Fuel to the other injectors can remain the same, be increased, or be reduced by a lesser amount. Moreover, it may be desirable only to adjust fuel flow to one or more fuel injectors through only one of the fuel circuits. For example, if an adjustment is necessary due to engine conditions, fuel flow through only the main fuel circuit in certain fuel injectors can be reduced by trimming the flow of fuel through a proportional valve through which the main fuel flow to that injector flows.

FIG. 7 illustrates an example system 700, which is similar to system 600 of FIG. 6. Additionally, the fuel injectors 110 of FIG. 7 are instrumented as described above, and therefore are capable of providing feedback to the digital control unit 20, to help maintain the engine within desired operation parameters.

In an active fuel trimming mode, a valve assembly is used to deliver a percentage or proportion of the mean fuel flow through one or more of the instrumented fuel injectors 110a-110h as commanded by electronic engine control 20.

When called for due to low power operating conditions, in an active staging mode a valve assembly in each of the instrumented fuel injectors 110a-110h (e.g., see FIG. 2) is either completely closed to fuel flow or completely open to fuel flow, as commanded by electronic engine control 20. In the case of instrumented piloted fuel injectors having main and pilot fuel circuits, the main and/or pilot fuel circuits in each fuel injector can be actively trimmed and/or staged in this manner. The valves used to accomplish this can be any of those set forth herein.

Those skilled in the art will appreciate that a combustor will operate more efficiently and effectively if the combusted gas medium exhibits a desirable circumferential pattern factor before it is delivered to the turbine. By lowering the circumferential pattern factor, a more uniform temperature profile and distribution of the products of combustion can be achieved and maintained at the exit of the combustor. The circumferential pattern factor can be adjusted by controlling fuel distribution in the combustor. Generally, as set forth hereinabove, the pattern factor is defined using the mean combustor exit temperature (T4) into the turbine, where the Pattern Factor=$[(T_{max}-T_4)/(T_4-T_3)]$, where $T_3$ is the combustor inlet temperature, and $T_{max}$ is the maximum combustor temperature.

In accordance with the subject invention, fuel distribution in a combustor is actively controlled using the electromechanical fuel modulation valves associated with the instrumented fuel injectors described above. For example, combustion conditions are observed and/or detected (e.g., levels of OH and/or CH radical emissions) and used to ascertain equivalence ratios for the combustion process. Once the equivalence ratios are determined, adjustments to fuel flow can be made to lower the circumferential pattern factor. As explained in more detail below, fuel distribution in the combustor can be adjusted to obtain a desirable pattern factor though fuel trimming and/or staging.

The equivalence ratio of a combustion system is defined as the ratio of the fuel-to-oxidizer ratio to the stoichiometric fuel-to-oxidizer ratio. An equivalence ratio greater than unity—that is, greater than a value of 1—represents a rich fuel to oxidizer ratio (excess fuel) in the fuel-oxidizer mixture than what would be required for complete combustion, irrespective of the fuel and oxidizer being used. An equivalence ratio of less than unity represents a lean mixture or a deficiency of fuel, with equivalently excess oxidizer in the fuel-oxidizer mixture.

Referring to FIG. 2 in conjunction with FIG. 5, in response to observed or otherwise detected combustion conditions and/or ascertained equivalence ratios, the active pattern factor control system can selectively or programmatically operate in a trimming mode to obtain a desirable circumferential pattern factor. By way of example, in a fuel trimming mode, an electronic engine control (e.g., a FADEC) commands the electromechanical valve assemblies in fuel injectors 110b, 110d, 110f and 110g to deliver a smaller percentage of fuel to the combustion chamber than the valve assemblies in fuel injectors 110a, 110c, 110e and 110h, and thereby adjusts the pattern factor in the combustor. In this case, a variable displacement valve of a suitable type can be actuated in order to trim the fuel by the desired amount. Alternatively, a pulsating valve can be utilized in place of a variable displacement proportional valve, in order to provide pressure modulation and thus a reduced overall flow rate of fuel. The valves described by Cornwell (U.S. Patent Publication No. 2007/0151252) can also be used in this manner.

In response to observed or otherwise detected combustion conditions and/or ascertained equivalence ratios, the system can selectively or programmatically operate in a staging mode under low power conditions. As set forth above, staging does not conflict with the objectives of the present invention, and can therefore be utilized in conjunction with the pattern factor control methods and systems of the invention. By way of example, in a staging mode, an electronic engine control (e.g., FADEC) commands the electromechanical valve assemblies in fuel injectors 110a, 110c, 110e, 110f and 110h to move to a fully open position, and commands the valve assemblies in fuel injectors 110b, 110d and 110g to move to a fully closed position, thereby maintaining the desired engine operating parameters. In this case, a variable displacement valve or a binary valve can be utilized, but a binary valve is likely to act more quickly and therefore maintain engine operating parameters more quickly than many variable displacement valves.

As mentioned above, alternatively to or in addition to using optical sensors for observing and/or detecting chemical reactions correlating to equivalence ratios and their associated pattern factors, and as a means of providing control feedback to the system, it is envisioned that injector mounted flow sensors can also be used to provide active combustion control feedback. In particular, the known flow values (volumetric and/or mass flow) though each fuel injector can be used to maintain a uniform supply of fuel at each injector, and thereby generate low circumferential pattern factor.

As set forth above, and with reference to FIGS. 1-7, methods of actively controlling a combustion pattern factor in a gas turbine engine 10 can include the steps of issuing fuel into a combustion chamber (e.g., combustion chamber 14 in FIG. 1) of the gas turbine engine through one or more circumferentially disposed fuel injectors (e.g., fuel injectors 110a-h of FIG. 2), determining an initial circumferential pattern factor in the combustion chamber, and adjusting fuel flow through one or more selected fuel injectors based on the initial circumferential pattern factor, to yield a modified circumferential pattern factor in the combustion chamber. Adjustments, are implemented utilizing valves as set forth hereinabove.

The step of determining an initial circumferential pattern factor in the combustion chamber can, in-turn, include the steps of detecting a chemiluminescent signature within the combustor, correlating the chemiluminescent signature to an equivalence ratio, and computing the initial circumferential pattern factor based on the equivalence ratio. Such computation can be handled by an electronic controller 20 or 170, as illustrated in FIGS. 5-7.

The chemiluminescent signature is preferably obtained optically, which can be accomplished by way of the optical sensor array 140 of FIG. 4A and FIG. 5, for example. A signal from the sensor array 140 is output to the electronic controller 170, where analysis of the chemiluminescent signature is carried out by the signal processor 175, in the illustrated embodiment or alternatively in other embodiments in accordance with the invention. The electronic controller 170, which can be embodied as a FADEC, then outputs an appropriate signal to one or more valves 612 associated with one or more fuel injectors, to alter the fuel flow thereto, which thereby modifies the circumferential pattern factor in the combustion chamber to maintain an acceptable pattern factor.

Alternatively, in accordance with another aspect of the invention, the step of determining an initial circumferential pattern factor in the combustion chamber can include measuring temperatures at a plurality of circumferential positions at the combustor exit and computing the initial circumferential pattern factor based on the measured temperatures. In this alternative manner of determining a circumferential pattern factor, the circumferential pattern factor can be determined by directly measuring the temperature in various circumferential locations of the combustion chamber near the exit thereof, prior to combustion gas entrance into the turbine. The temperature can be measured directly through a sensor such as a thermocouple arranged on the combustor, or through optical detection or through use of an ion probe.

The signal output from a temperature sensor can then be fed back to the respective controller, such as controller 20 or 170, which then commands valves providing fuel to areas having high relative temperatures to close slightly or to attenuate fuel flow in another manner, thereby reducing fuel flow to that region, and accordingly, lowering the local temperature of that region.

In accordance with still another aspect of the invention a method of actively controlling a combustion pattern factor in a gas turbine engine includes measuring a fuel flow rate through one or more of the plurality of fuel injectors, comparing fuel flow rate through one or more of the plurality of fuel injectors, and adjusting fuel flow rate through one or more injectors to maintain equal fuel flow to each injector, to achieve an optimal pattern factor. In such an instance, the fuel flow rate can be measured by measuring volumetric of mass flow rates, for example. Fuel flow rates, as described hereinabove can be adjusted by actuating a valve to vary a pressure drop thereacross, for example.

Such flow rates can be taken before or after a valve. The pressure drop across, and therefore the fuel flow rates through a plurality of injectors can thus be maintained at the same rate for each of the plurality of injectors, in order to promote a favorable pattern factor. Data from one or more flow sensors (e.g., mass flow sensor 490) can be fed back into the electronic controller 20 or 170, which then can compare the measured value with a command value, and reconcile any discrepancies by further adjusting respective valves.

Moreover, in accordance with the invention an alternative method to assure a favorable pattern factor is to deliver precisely equal amounts of fuel to all fuel injectors in the turbine. Utilizing multiple flow sensors, such as sensor 490, allows feedback of information to the electronic controller, such as controller 20 (FIG. 6-7) or 170 (FIG. 5), which can compare the values at each flow sensor and adjust the respective valves to result in consistent and equal fuel delivery to each fuel injector, thereby promoting a desirable pattern factor.

Utilizing feedback information from sensors, fuel flow can be adjusted while monitoring combustion conditions, including pattern factor, for example. If necessary, the rate of change of fuel flow can be reduced, by commanding one or more valves 612 to close more slowly, to temporarily cease closing, or to reverse direction to once again maintain a desirable pattern factor. Once it is determined that the combustion conditions within the turbine are favorable, fuel reduction to one or more fuel injectors can recommence. Such feedback information can be utilized at any time during operation of a gas turbine designed and constructed and operated in accordance with the invention.

In accordance with one aspect, adjustment of fuel flow can be accomplished by way of a variable displacement valve, which may be embodied as a proportional valve or a pulsating valve, and provided separately or in conjunction with a binary valve. The step of adjusting fuel flow can include modulating fuel through a pulsating valve to an injector, and/or by trimming fuel using a proportional valve. The pulsating valve can be a solenoid valve having only open and closed positions, for example, or alternatively can be of a different configuration, as described hereinabove.

Fuel flow adjustment, as commanded by the controller 170 can include trimming of proportional valves or modulating fuel flow through pulsating valves associated with selected fuel injectors, e.g., injectors 120*a*, 120*d* and 120*h*, while maintaining fuel to other injectors, e.g., injectors 120*b*, 120*c*, 120*e*, 120*f*, and 120*g*. Each valve, and thus the fuel flow to each injector can be independently controlled and adjusted. Fuel flow through each injector can be confirmed by the measured mass and/or volumetric fuel flow rate values, as described above.

One or more of the injectors can be connected to a valve or plurality of valves by way of a conduit as an alternative to a direct connection between the valve and the injector, however shorter distances between the valve and injector are preferred to reduce damping within the fuel system. In either arrangement, fuel flow to each fuel injector can be independently controlled.

Alternatively, fuel flow through one circuit of the fuel injector, e.g., the main fuel circuit, can be controlled separately with an electromechanical valve provided for each injector, such as a proportional valve, while fuel flow through another circuit of the fuel injector, e.g., the pilot fuel circuit; can be controlled by a valve common to a plurality of fuel injectors. The controller 170, in any arrangement, is configured and adapted to control such a configuration.

Adjustment of fuel flow from selected fuel injectors can include adjusting an electro-mechanical variable-displacement valve assembly, integrated with selected fuel injectors to adjust an amount of fuel flowing through said selected fuel injectors. The adjustment of such variable-displacement valve can be signaled by the electronic controller 170. Such electro-mechanical variable-displacement valves can be integrated with individual fuel injectors, as described above, or simply arranged near the fuel injector, such as on a fuel supply line near the fuel injector. The electro-mechanical valve can be embodied so as to be adjustable across any range of pressure drops, resulting in a range of potential fuel mass flow rates, however, in accordance with one aspect of the invention, the valve is adapted and configured to be opened or closed to result in an adjustment fuel flow by about 20 percent about a mean fuel flow rate.

Based on information obtained from the sensors provided, the electronic controller 20 or 170 determines whether adjustment of fuel flow to one or more fuel injectors is required in order to adjust and maintain an acceptable pattern factor. As set forth above, a flow rate sensor can be utilized to gauge the fuel flow through each injector, as well as to confirm any adjustments made to the valve.

As set forth above, the digital control unit 20 or 170 can be embodied as a FADEC, or alternatively as an auxiliary control unit with a separate FADEC for controlling other engine operating parameters, which it may be in communication. Alternatively still, distributed control units can be arranged at or near each injector. Such distributed control units can communicate with one another, relaying and comparing relevant information to other control units, so that a determination regarding fuel flow rates for each injector can be made. Accordingly, temperature data, fuel flow rates, spectral data relating to equivalence ratios and thus, to pattern factor or other measured parameters can be compared among distributed control. Following such a comparison, the appropriate valves can be adjusted to a point where the respective parameters (e.g., temperature data, fuel flow rates, spectral data) indicate a desirable pattern factor.

Although the active pattern factor control systems and methods of the subject invention and the components thereof, have been described with respect to preferred embodiments, those skilled in the art will readily appreciate that changes and modifications may be made thereto without departing from the spirit and scope of the subject invention.

What is claimed is:

1. A method of actively controlling a combustion pattern factor in a gas turbine engine comprising the steps of:
    a) issuing fuel into a combustion chamber of the gas turbine engine through one or more circumferentially disposed fuel injectors;
    b) determining an initial circumferential pattern factor in the combustion chamber by:
        i) detecting a chemiluminescent signature within the combustor;
        ii) correlating the chemiluminescent signature to an equivalence ratio; and
        iii) computing the initial circumferential pattern factor based on the equivalence ratio; and
    c) adjusting fuel flow through one or more selected fuel injectors based on the initial circumferential pattern factor, to yield a modified circumferential pattern factor in the combustion chamber.

2. The method of claim 1, further comprising the step of measuring fuel flow rate through the one or more circumferentially disposed fuel injectors prior to and following the adjusting step.

3. The method according to claim 1, wherein the step of adjusting fuel flow includes adjusting fuel flow to a pilot fuel circuit of a fuel injector.

4. The method according to claim 1, wherein the step of adjusting fuel flow includes adjusting fuel flow to a main fuel circuit of a fuel injector.

5. The method according to claim 1, wherein the step of adjusting fuel flow from selected fuel injectors includes opening or closing an electromechanical valve.

6. The method according to claim 5, further comprising providing a valve arranged on a manifold, so as to be capable of adjusting fuel flow to a pilot fuel circuit and a main fuel circuit.

7. The method according to claim 1, wherein the step of adjusting fuel flow through the selected fuel injectors includes adjusting fuel flow to one or more selected fuel injectors, while maintaining fuel flow at an unchanged rate to the remaining injectors.

8. The method according to claim 1, wherein the step of adjusting fuel flow through the selected fuel injectors includes adjusting an electro-mechanical variable-displacement valve assembly integrated with the selected fuel injectors to adjust an amount of fuel flowing through the selected fuel injectors.

9. The method according to claim 8, further comprising the step of adjusting the electro-mechanical valve to vary fuel flow rate by about +/−20 percent from a mean fuel flow rate.

* * * * *